Jan. 1, 1952
W. W. MOE
MODULATION SYSTEM
Filed Aug. 3, 1949
2,580,692
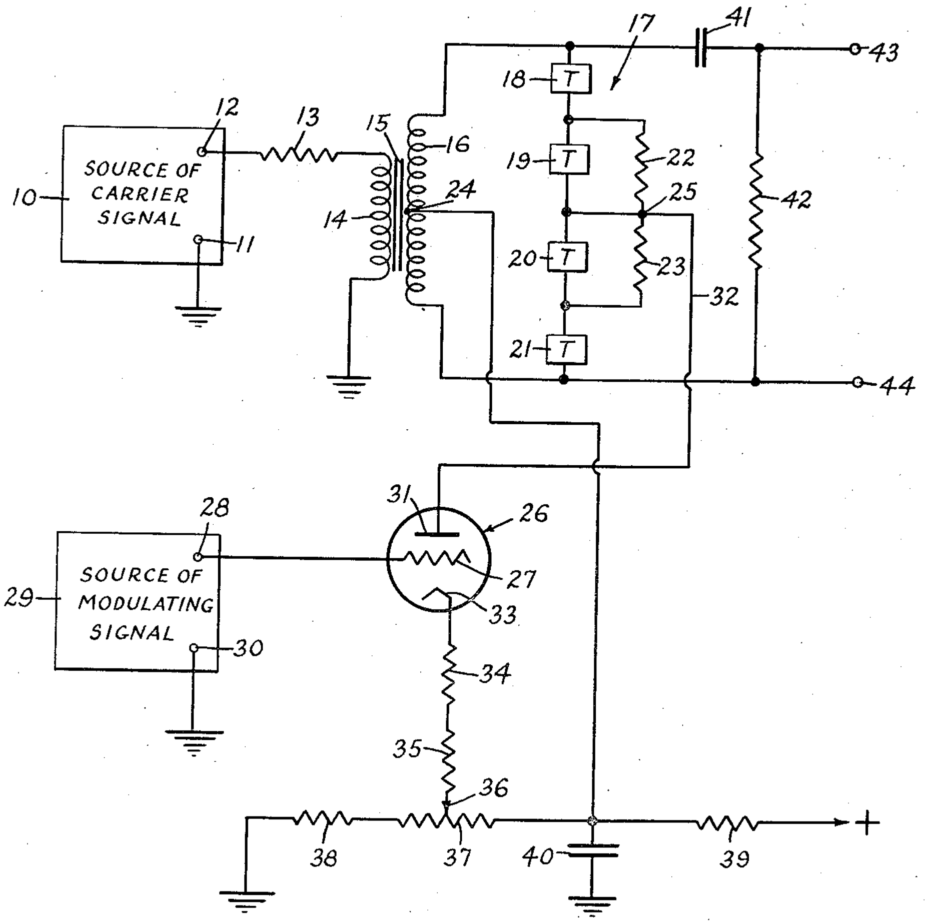
INVENTOR.
WILLIAM WEST MOE
BY
Campbell, Brumbaugh, Free & Graves
HIS ATTORNEYS.

Patented Jan. 1, 1952 2,580,692

UNITED STATES PATENT OFFICE 2,580,692

MODULATION SYSTEM

William West Moe, Stratford, Conn., assignor to Time, Incorporated, New York, N. Y., a corporation of New York Application August 3, 1949, Serial No. 108,290

6 Claims. (Cl. 332—47)

The present invention relates to modulation systems, and more specifically to a new and improved electrical system for modulating the amplitude of one electric signal in accordance with the amplitude of another.

In electrical color correction systems of the type employed in making color reproductions, it is often desired to modify an electric signal $E_1$ as a function of a power less than one of another signal $E_2$ to obtain a resultant signal $E_3$ of the form $$E_3=\frac{KE_1}{E_2^n}$$

where $n$ is less than one. It has been proposed, heretofore, to compress the signal $E_2$ to the desired exponent in a suitable electric network, and then to modulate the signal $E_1$ by the compressed signal $E_2^n$ by means of a multigrid electron tube converter circuit. While a system of this type is effective for the purpose, it entails the use of two separate devices, the compressor and the converter, each of which includes a plurality of components.

The principal object of the present invention is to provide a new and improved modulation system which is capable of functioning in a highly effective manner according to the requirements stated above, yet embodies a minimum number of simple components.

Another object of the invention is to provide a new and improved modulation system of the above character which does not utilize a converter type tube for effecting the desired signal modulation.

These and other objects of the invention are attained by impressing one of two signals upon a voltage divider comprising a fixed impedance and a variable impedance. The variable impedance is the impedance reflected into the primary winding of a transformer having a secondary winding connected to an impedance network, the impedance of which is controlled in accordance with another signal. The portion of the first signal which appears across the impedance network, is, therefore, a function of the second signal and corresponds to the modulation of the first signal by the second.

Where it is desired to modulate the first signal as a function of a power less than one of the second signal, the impedance network is preferably designed so that its impedance will vary in accordance with the desired power of the second signal.

Additional objects and advantages of the invention will be apparent from the following detailed description of a typical embodiment thereof shown in the accompanying drawing.

By way of illustration, the invention will be described herein as applied to the modulation of an alternating current carrier signal by a continuous current signal whose intensity varies in accordance with certain intelligence that is to be transmitted. Referring to the drawing, an alternating current carrier of suitable frequency, say, 7,680 cycles, for example, may be provided by any suitable source 10. One terminal 11 of the source 10 may be grounded, as shown, and the other terminal 12 may be connected in series with a fixed resistance 13 of realtively high value and the primary winding 14 of a transformer 15, the other terminal of which is connected to ground, as shown. The secondary winding 16 of the transformer 15 is connected to an impedance network 17 whose impedance can be varied as a function of the intensity of a modulating signal.

In the typical form of the invention shown, the impedance network 17 comprises a plurality of thyrite resistors 18, 19, 20 and 21 connected in series and having fixed resistors 22 and 23 connected in parallel with the thyrites 19 and 20, as shown. The composition of thyrite resistors is well known, as is the fact that their resistance varies in accordance with the current flowing through them.

The impedance of the network 17 may be caused to vary in accordance with a modulating signal by impressing the modulating signal between the midtap 24 of the transformer secondary winding 16 and the midtap 25 on the impedance network 17, as shown. The modulating signal may be obtained from any suitable source such as, for example, an electron tube 26, the control grid 27 of which is connected to one terminal 28 of a suitable source of modulating voltage 29, the other terminal 30 of which is connected to ground, as shown. The plate electrode 31 of the tube 26 is connected by a conductor 32 to the impedance network midpoint 25 while the cathode 33 is connected in series with the cathode resistors 34 and 35 to the variable contact 36 of a potentiometer 37. The potentiometer 37 is connected to ground through a resistor 38 and to a suitable source of plate voltage supply (not shown) through conventional filter means including a resistor 39 and a shunt condenser 40.

In operation, let it be assumed that it is desired to obtain an output signal $E_3$ which is a function of a carrier signal $E_1$ and also of a modulating signal $E_2$ taken to a power less than one i. e., $$E_3=\frac{KE_1}{E_2^n}$$

where $n$ is less than one. Let it be assumed further that an exponent of .56 is desired. The desired results may be achieved by using thyrite resistors 18, 19, 20 and 21 such as the GE type 8396839 G1, for example, and shunting the thyrites 19 and 20 by resistors 22 and 23 each of approximately 2200 ohms. The current supplied to the midtap 25 of the impedance network 17 should be made relatively large as compared with the carrier frequency current supplied from the secondary winding 16 of the transformer 15.

Since the resistance of each of the thyrite resistors is inversely proportional to an exponent of the current passing through them, corresponding resistance variations are reflected into the primary 14 of the transformer 15. The circuit thus acts as a voltage divider comprising the relatively large fixed resistor 13 and the variable resistance reflected into the primary winding 14 of the transformer 15. For the circuit component values specified above, the latter variable resistance is inversely proportional to the .56 power of the current supplied from the tube 26, which is in turn proportional to the modulating signal from the source 29. The output of the modulator system, therefore, is of the form:

$$\text{Modulator output voltage}=\frac{K\ (\text{Input signal volts})}{(\text{Control input volts})^n}$$

The modulator output which appears across the impedance network 17 is transmitted through a blocking condenser 41 and is impressed upon a load resistor 42 having output terminals 43 and 44.

By virtue of the balanced circuit shown, it will be seen that current flowing from the tube 26 does not develop any over-all voltage in the transformer 15 and hence, in the circuit connected to the output terminals 43 and 44.

From the foregoing, it will be understood that the invention provides a novel and highly effective modulation system for modulating the intensity of one signal as a function of a power less than one of another signal. By utilizing nonlinear impedances in a voltage divider circuit of the type disclosed herein, it is possible to effect compression of a modulating signal to a desired exponent and simultaneously to modulate another signal with a minimum number of circuit elements and without utilizing an electron tube converter. The invention thus provides a modulation system which is simple in construction and operation and which embodies a minimum number of parts.

It will be understood that the specific circuit described above and illustrated in the drawing, by way of example, can be modified within the spirit of the invention. Thus, the values for the several components of the nonlinear impedance network can be changed depending upon the desired exponent of compression. Further, the modulation system may be used to effect modulation of different kinds of signals as will be apparent to those skilled in the art. The specific embodiment disclosed herein, therefore, is not to be regarded as imposing any limitation whatsoever upon the scope of the following claims.

I claim:

1. In a signal modulation system, the combination of voltage divider means having input terminals adapted to be energized by one signal and comprising a fixed impedance and a variable impedance in series, said variable impedance including elements having impedances that vary as a function of the intensity of the current flowing therethrough, means for causing to flow through said impedance elements current which varies as a function of another signal, whereby the signal developed across said variable impedance will be a function of said two signals, and output terminals connected to receive a voltage that is a function of the portion of said one signal developed across said variable impedance.

2. In a signal modulation system, the combination of voltage divider means having input terminals adapted to be energized by one signal and comprising a fixed resistance and a variable resistance in series, said variable resistance including thyrite resistor means therein, means for energizing said thyrite means as a function of another signal, thereby causing said variable resistance to vary as a function of said another signal, whereby the signal developed across said variable resistance will be a function of said two signals, and output terminals connected to receive a voltage that is a function of the portion of said one signal developed across said variable resistance.

3. In a signal modulation system, the combination of voltage divider means having input terminals adapted to be energized by one signal and including a fixed resistance, a transformer having a primary winding connected in said voltage divider means and having a secondary winding, a variable resistance network connected to said transformer secondary winding, said network including elements whose resistance is a function of the current flowing through them, means for energizing said elements with current which varies as a function of another signal, whereby the signal developed across said network will be a function of both of said signals, and output terminals connected to receive a voltage representative of the voltage developed across said resistance network.

4. In a signal modulation system, the combination of voltage divider means adapted to be energized in accordance with one signal and including a fixed resistance, a transformer having a primary winding connected in series with said fixed resistance and having a secondary winding provided with a midtap, a double-ended resistance network connected to the secondary winding of said transformer and having a midtap, said resistance network including elements whose resistance is a function of the current flowing through them, and electrical means connected to said transformer secondary winding midtap and to said network midtap for energizing said elements with current which varies as a function of another signal.

5. In a signal modulation system, the combination of voltage divider means adapted to be energized in accordance with one signal and including a fixed resistance, a transformer having a primary winding connected in series with said fixed resistance and having a secondary winding provided with a midtap, a resistance network connected to the secondary winding of said transformer and having a midtap, said network comprising a plurality of thyrite resistors disposed symmetrically about said network midtap, and electrical means connected to said secondary winding midtap and to said thyrite resistors for energizing the latter with current which varies as a function of another signal.

6. In a signal modulation system, the combination of voltage divider means adapted to be energized in accordance with one signal and including a fixed resistance, a transformer having a primary winding connected in series with said fixed resistance and having a secondary winding provided with a midtap, a resistance network connected to the secondary winding of said transformer and having a midtap, said network comprising a plurality of thyrite resistors disposed symmetrically about said network midtap, certain of said thyrite resistors being shunted by fixed resistors, an electron tube having plate, grid and cathode electrodes, electrical connections between said transformer secondary winding midtap and said network midtap and the plate-cathode circuit of said tube, and a source of modulating signal connected in the grid-cathode circuit of said tube.

WILLIAM WEST MOE.

REFERENCES CITED

The following references are of record in the file of this patent:

UNITED STATES PATENTS

| Number | Name | Date |
|---|---|---|
| 1,998,119 | Cox | Apr. 16, 1935 |
| 2,152,016 | Baesecke et al. | Mar. 28, 1939 |
| 2,268,837 | Lutzenberger | Jan. 6, 1942 |

FOREIGN PATENTS

| Number | Country | Date |
|---|---|---|
| 522,132 | Great Britain | June 10, 1940 |